US008212521B2

(12) United States Patent
Choi

(10) Patent No.: US 8,212,521 B2
(45) Date of Patent: Jul. 3, 2012

(54) SYSTEM AND METHOD FOR CHARGING A MOBILE DEVICE

(76) Inventor: Woncheol Choi, San Jose, CA (US)

( * ) Notice: Subject to any disclaimer, the term of this patent is extended or adjusted under 35 U.S.C. 154(b) by 363 days.

(21) Appl. No.: 12/652,673

(22) Filed: Jan. 5, 2010

(65) Prior Publication Data

US 2010/0171464 A1   Jul. 8, 2010

Related U.S. Application Data

(60) Provisional application No. 61/204,202, filed on Jan. 5, 2009.

(51) Int. Cl.
*H02J 7/00* (2006.01)
(52) U.S. Cl. ......... 320/114; 320/106; 320/107; 320/112
(58) Field of Classification Search .................. 320/112, 320/114, 107, 106
See application file for complete search history.

(56) References Cited

U.S. PATENT DOCUMENTS

2005/0189899 A1*   9/2005   Tsurumi ................. 318/568.12

\* cited by examiner

*Primary Examiner* — Samuel Berhanu
(74) *Attorney, Agent, or Firm* — Hanbum Cho

(57) ABSTRACT

A system and method for charging a mobile device is disclosed. According to one embodiment, a mobile charging system comprises a mobile device having a battery, a robotic device removably connected to the mobile device, and a charging station removably connected to the robotic device. The robotic device is adapted to detect docking of the mobile device. If the docking of the mobile device is detected, the robotic device autonomously returns to the charging station for charging the battery of the mobile device. The robotic device receives an instruction from the mobile device or a user and performs tasks associated with the instruction.

20 Claims, 4 Drawing Sheets

SYSTEM AND METHOD FOR CHARGING A MOBILE DEVICE

The present application claims the benefit of and priority to U.S. Provisional Patent Application Ser. No. 61/204,202 filed on Jan. 5, 2009, and is hereby incorporated by reference.

FIELD

The field of this disclosure relates generally to charging systems for mobile devices, particularly to robotic charging systems for mobile phones.

BACKGROUND

Mobile phones have become an essential part of our lives. Mobile phone users can connect to others wherever they may be, including residence, offices, restaurants, cars, etc. as long as they are within the coverage area of the network. Newer technologies keep entering the mobile phone market promising improved communication speed and signal quality with added convenience to the user.

However, the benefits of mobility earned by mobile phones are compromised by battery runtimes. Every once in a while, mobile phones need to be charged from a power source. While a mobile phone is being charged, its user loses mobility because it needs to be plugged into the power source.

Various techniques have been developed for charging mobile phones. For example, mobile phones may be charged by a solar cell charger or hand-powered charger where no other power sources are available. However, these power charging techniques are primarily designed for use under emergency conditions due to their limited charging capability let alone the added cost.

With recent developments and reduced cost of ownership, electronic appliances and/or toys with mobility have gained popularity. Such devices are capable of autonomously sliding, moving, walking, or flying with the integrated motors at a given command. For example, Roomba™ by iRobot is an electronic vacuum robot that sweeps around the house and charges itself when a task is completed. Sony's toy dog robot can walk like a real dog and dock itself to a power station for charging when it detects low voltage from the battery.

Mobile phones and mobile robots are common in that they both are mobile. They require occasional charging because they are operated on a battery. However, mobile phones are carried by a human, hence the mobility thereof is limited by the mobility of the human who carries it. On the other hand, mobile robots are autonomously mobile such that they can move without human interruption. Mobile phones equipped with such autonomous mobility would not only eliminate human interruption for charging but also open up a new slew of opportunities that conventional mobile phones were incapable of providing because of the limited mobility and the requirement for human interruption for charging. Additionally, mobile phones equipped with autonomous mobility would be entertaining and provide pride of ownership to the consumers.

SUMMARY

A system and method for charging a mobile device is disclosed. According to one embodiment, a mobile charging system comprises a mobile device having a battery, a robotic device removably connected to the mobile device, and a charging station removably connected to the robotic device. The robotic device is adapted to detect docking of the mobile device. If the docking of the mobile device is detected, the robotic device autonomously returns to the charging station for charging the battery of the mobile device. The robotic device receives an instruction from the mobile device or a user and performs tasks associated with the instruction.

The above and other preferred features described herein, including various novel details of implementation and combination of elements, will now be more particularly described with reference to the accompanying drawings and pointed out in the claims. It will be understood that the particular methods and circuits are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate presently preferred embodiment and together with the general description given above and the detailed description of the preferred embodiment given below serve to explain and teach the principles described herein.

Figure 1:
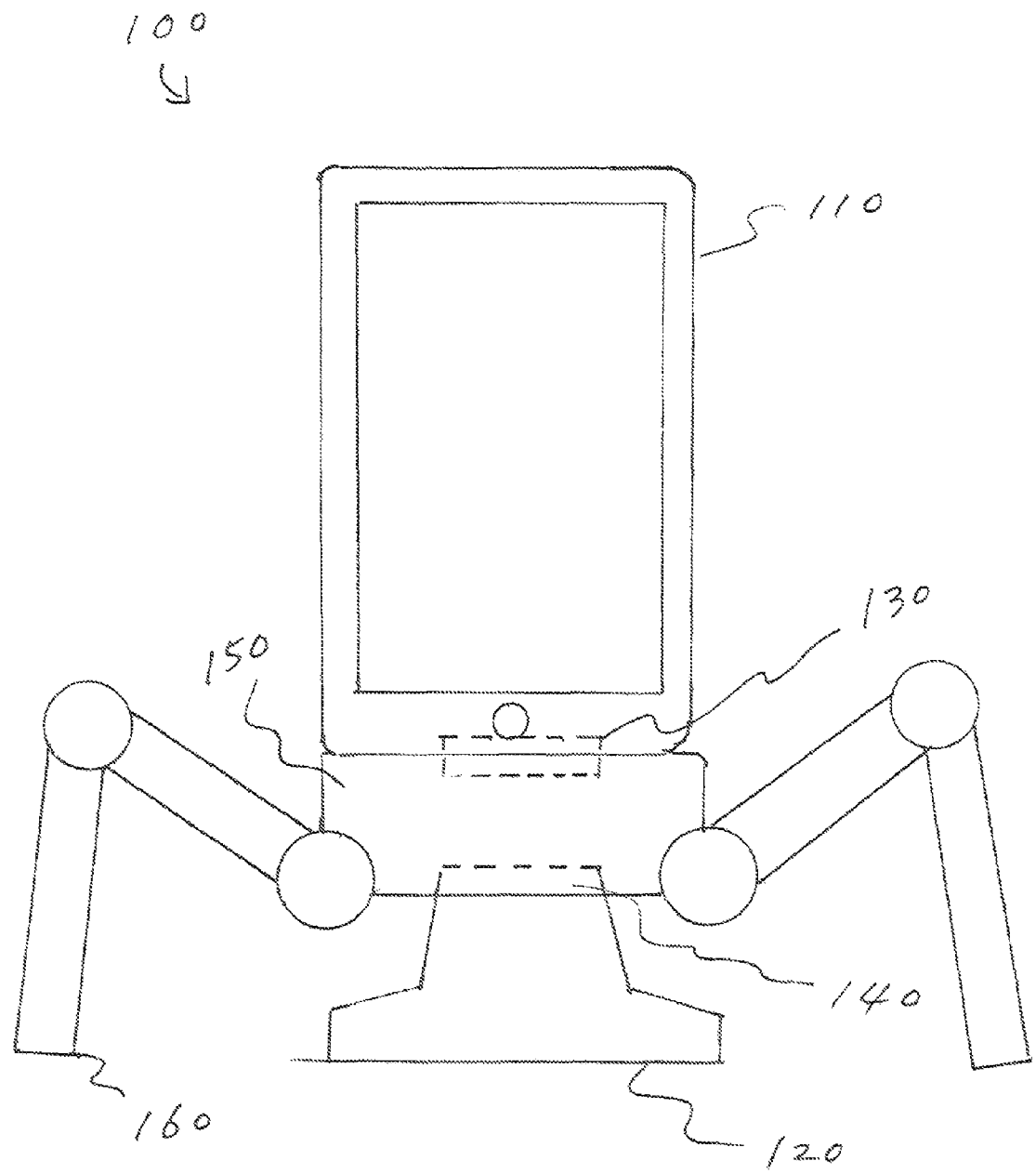
FIG. 1 illustrates an exemplary mobile charging system for a mobile device, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A system and method for charging a mobile device is disclosed. According to one embodiment, a mobile charging system comprises a mobile device having a battery, a robotic device removably connected to the mobile device, and a charging station removably connected to the robotic device. The robotic device is adapted to detect docking of the mobile device. If the docking of the mobile device is detected, the robotic device autonomously returns to the charging station for charging the battery of the mobile device. The robotic device receives an instruction from the mobile device or a user and performs tasks associated with the instruction.

In the following description, for purposes of explanation only, specific nomenclature is set forth to provide a thorough understanding. However, it will be apparent to one skilled in the art that these specific details are not required to practice the concepts described herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The above and other preferred features described herein, including various novel details of implementation and combination of elements, will now be more particularly described with reference to the accompanying drawings and pointed out in the claims. It will be understood that the particular methods and circuits are shown by way of illustration only and not as limitations of the claims. As will be understood by those skilled in the art, the principles and features of the teachings herein may be employed in various and numerous embodiments without departing from the scope of the claims.

FIG. 1 illustrates an exemplary mobile charging system 100 for a mobile device, according to one embodiment. Mobile charging system 100 includes a mobile device 110, a robotic device 150, a base station 120. Robotic device 150 has a docking interface 130 that releasably receives mobile device 110 and a charging interface 140 that releasably couples to base station 120. In a docked configuration as illustrated in FIG. 1, mobile device 110 is charged through the power source available at base station 120. Base station 120 is placed at a location near an electrical outlet and plugged into the electrical outlet.

According to one embodiment, mobile charging system 100 has a power source therein such that mobile charging system 100 does not have to return to the base station 120 for charging the mobile device 100. For example, mobile charging system 100 has a battery used to charge the battery of the mobile device 110. Upon detecting mobile device 110 at the docking interface 130, mobile charging system 100 starts charging mobile device 100. The power source of mobile charging system may be charged from an external power source at a different time.

The robotic device 150 has one or more legs 160 that provide walking capability to mobile charging system 100. In order to provide a vertical lifting motion as well as walking capability, articulated legs 160 may be used as illustrated in FIG. 1. Walking mechanism is illustrated in FIG. 1 for exemplary purpose only, and it is appreciated that other mobility mechanisms may be applied without deviating from the scope of the present subject matter such as moving on wheels, flying like a helicopter, hovering over a surface, etc.

According to one embodiment, robotic device 150 may be equipped with a processor, a memory, one or more actuators, at least one encoder for each actuator, and other components. The processor is the brain of robotic device 150 that provides controls for each actuator to perform a preprogrammed motion. The state of each actuator is sensed by the encoders and fed to the processor to calculate the output command for each actuator in a control loop.

According to one embodiment, mobile device 110 is synchronized with a computer (not shown) through base station 120 in a docked position. Mobile device 110 may be equipped with standard or proprietary electrical interface for charging and/or synchronization with base station 120 or computer. Alternatively, mobile phones may be synchronized real-time or pseudo real-time with a server using a push technology (e.g., Direct Push technology by Microsoft, Blackberry Enterprise Server (BES) by Research In Motion).

Figure 2:
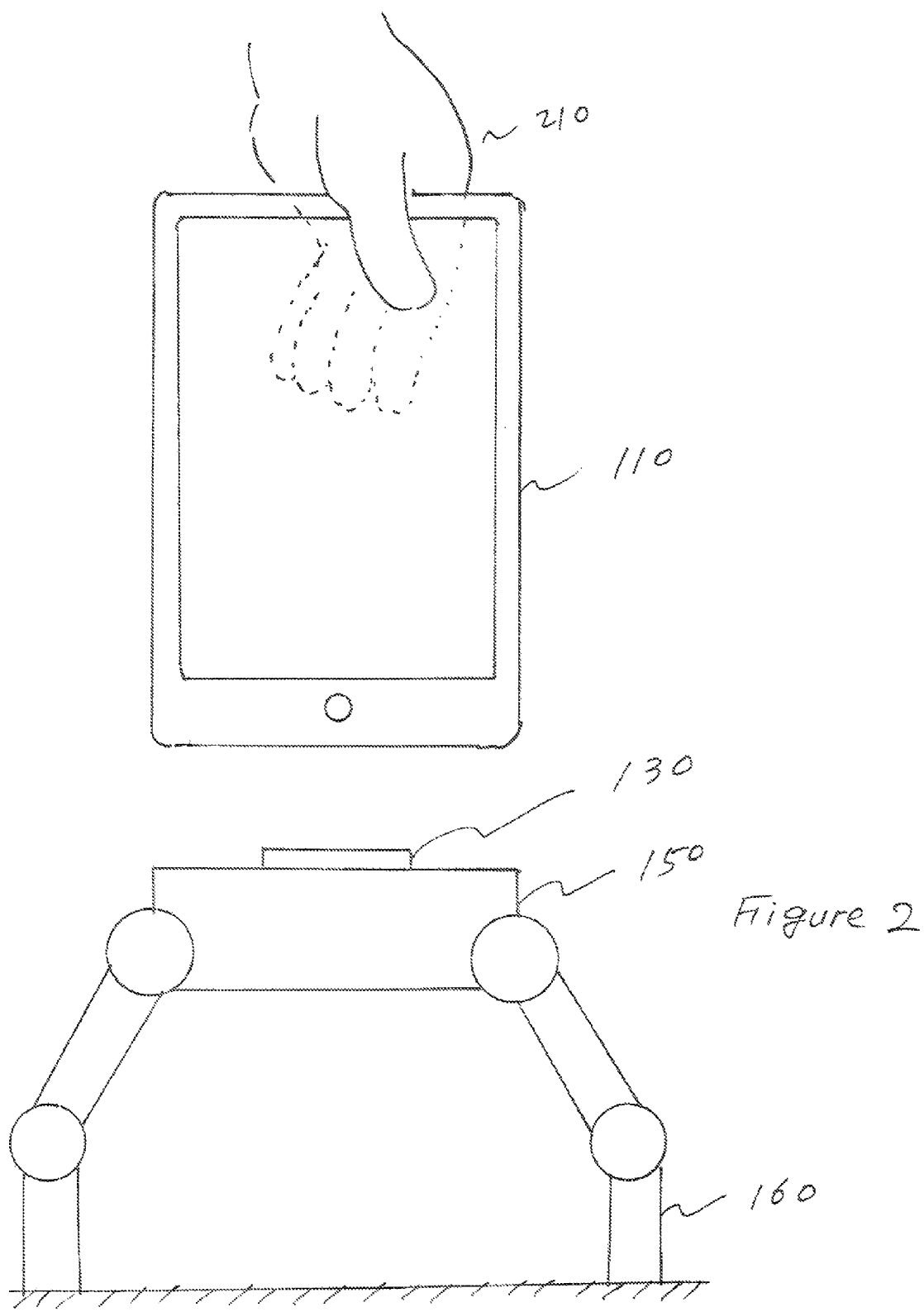
FIG. 2 illustrates an exemplary mobile charging system in an undocked configuration, according to one embodiment.

FIG. 2 illustrates an exemplary mobile charging system 100 in an undocked configuration, according to one embodiment. User 210 places mobile device 110 onto or removes mobile device 110 from robotic device 150 via docking interface 130. The placement onto or removal from robotic device 150 is a minimal human interaction to operate mobile charging system 100. By docking onto robotic device 150, mobile device 110 obtains autonomous mobility without human interruption. Docking interface 130 may be of a specific connector type for charging that is unique to mobile device 130. The connector type of docking station 130 may be interchangeable to accept many different types of mobile devices and manufacturers. Although docking interface 130 is shown in FIG. 2 to have a particular connector type (e.g., Apple iPhone's connector type), any type of connector interfaces may be used without deviating the scope of the present subject matter. For example, docking interface 130 may be of an insertion type such as a front-loading CD-ROM device.

Docking interface 130 may be a top, bottom or side mounting-type, depending on the design, connector type, and/or manufacturer of mobile device 110.

According to one embodiment, physical docking interface 130 and/or charging interface 140 is unnecessary when a non-contact charging method is used. For example, electromagnetic induction charging eliminates physical contact between a charger and a charged device. By placing nearby or in a designated area, mobile device 110 may be charged by electromagnetic induction. In this case, docking interface 130 may be understood a mounting interface that does not have physical contacts or contact leads to robotic device 150.

According to one embodiment, user 210 docks mobile device 110 to robotic device 150. In another embodiment, robotic device 150 approaches user 210 by detecting the presence of user 210 or by a command from user 210. When user 210 is detected or the command from user 210 is interpreted, robotic device 150 identifies the location of user 210 and offers an approach. If user 210 becomes undetected or another command for canceling the approach, robotic device 150 stands by or returns to base station 120.

According to one embodiment, robotic device 150 is equipped with a various type of sensors. Exemplary sensor include a motion sensor, vision sensor, a sonar sensor, a thermal sensor, an ultrasound sensor, a tactile sensor. The motion sensor detects the presence of mobile device 110. The motion sensor may also detect a particular motion of user 210 to execute predetermined commands, for example, a wake-up command, approach command, cancel command. According to another embodiment, robotic device 150 is equipped with a voice recognition device such that user 210 utters a voice command to robotic device 150. Various sensors may be equipped to deliver user commands, and it is appreciated that many types of sensor may be integrated with robotic device 150 to enrich its capability and intelligence without deviating from the present subject matter.

According to one embodiment, mobile phone 110 runs an application to detect the voltage level of the battery and generates a charging request command to robotic device 150. In order to be able to communicate with mobile phone 110, robotic device 150 may be equipped with a wireless communication module, such as Bluetooth®. After receiving the charging request command, robotic device 150 identifies whether mobile phone 110 is at an accessible location, for example, using a presence sensor. The signal strength may be used to determine the distance to mobile phone 110. If mobile phone 110 is detected and is determined to be accessible, robotic device 150 attempts to approach mobile phone 110. When approaching, robotic device 150 may signal user 210 using other medium of communication such as sound or light.

Mobile device 110 may be away from the surface that robotic device 150 moves on. In such a case, robotic device 150, while moving, continuously detects obstacles and attempts to go around the obstacles by continuously updating the path to mobile device 110. Robotic device 150 may be programmed to move to a predetermined position and stand by human action to dock mobile phone 110.

After mobile device 110 is docked with robotic device 150, mobile device 110 is capable of performing various tasks that are otherwise impossible. The processor of mobile phone 110 may run various applications to interact and communicate with robotic device 150 to perform various tasks. For example, mobile phone 110 detects low voltage from the battery and sends a charging request command. In response, robotic device 150 approaches mobile phone 110 in a hurried fashion, for example, by making short and fast steps. If the battery is near full, robotic device 150 may approach mobile phone 110 in a different manner signaling non-urgency for charging, for example, by making slow and enjoyable steps. Other expressions may be used to signal different conditions and states of mobile phone 110 and robotic device 150.

When mobile device 110 is docked onto robotic device 150, the docked robotic device 150 returns to base station 120 to begin charging. Alternatively, mobile phone 110 may signal robotic device 150 to return to base station 120 based on the battery level. When docked onto base station 120, robotic device may express the progress of charging using various signaling devices. For example, LED lights may change their colors to indicate charging levels. When mobile phone 110 is fully charged, robotic device 150 stands by and waits for human interruption for picking up.

Mobile device 110 may be a mobile phone, for example, an iPhone® of Apple Computer, Cupertino, Calif., a Blackberry® of Research In Motion of Waterloo, Canada, a PSP of Sony Entertainment of America. Alternatively, mobile device 110 may be a cordless phone, an MP3 player, a media player, an electronic book, a portable computer, or a digital camera. Conventional mobile devices are required to be placed in a docking station or connected to a power cord by a user for recharging or synchronization with a computer. However, with the added mobility of mobile charging system 100, mobile device 110 may be autonomously docked to base station 120 with little or no assistance from user 210.

Mobile charging system 100 brings fun and amusement as well as pride of ownership to the owner. When user 210 sits on his/her chair in the office, mobile charging system 100 detects the presence of user 210. After identifying user 210's intent, for example, by a voice command or gesture, robotic device 150 embarks on an approach to user 210 in an entertaining manner. For example, robotic device 150 walks, jumps, flies, slides or drives on wheels toward user 210 and positions itself at a convenient location within user 210's reach.

According to one embodiment, user 210 may program or customize robotic device 150 to his/her tasting. Robotic device 150 may be equipped with peripheral devices such as speakers and LED lights that add personality thereto. Many customized expressions are possible using the peripheral devices. As discussed above, the expression for urgency may be expressed with fast and short steps. It may be augmented by LED lights blinking at a faster interval. In this manner, mobile charging system 100 is transformed to a personal assistance to provide services that other robotic devices are unable to deliver.

Mobile device 110 adds intelligence to robotic device 150, and the integrated mobile device 110 acquires autonomous mobility that it lacks in return. This unique combination of mobile phone 110 and robotic device 150 opens up a plethora of applications that separate mobile device 110 and robotic device 150 were unable to execute. The integrated system may be a new mobile toy with enhanced intelligence. Mobile device 110 typically contain a processor, a microphone, a speaker, and optionally a inertia sensor, a global positioning system (GPS), a Universal Serial Port (USP) and/or the like. Robotic device 150 may also contain a processor but its capacity is often optimized and limited to perform limited tasks that robotic device 150 is intended to perform. The mobility mechanism of robotic device 150 simply receives a command from the processor and moves according to the command. With the added processing power that mobile device 110 may provide, the integrated mobile device 110 is able to perform complex tasks.

Figure 3:
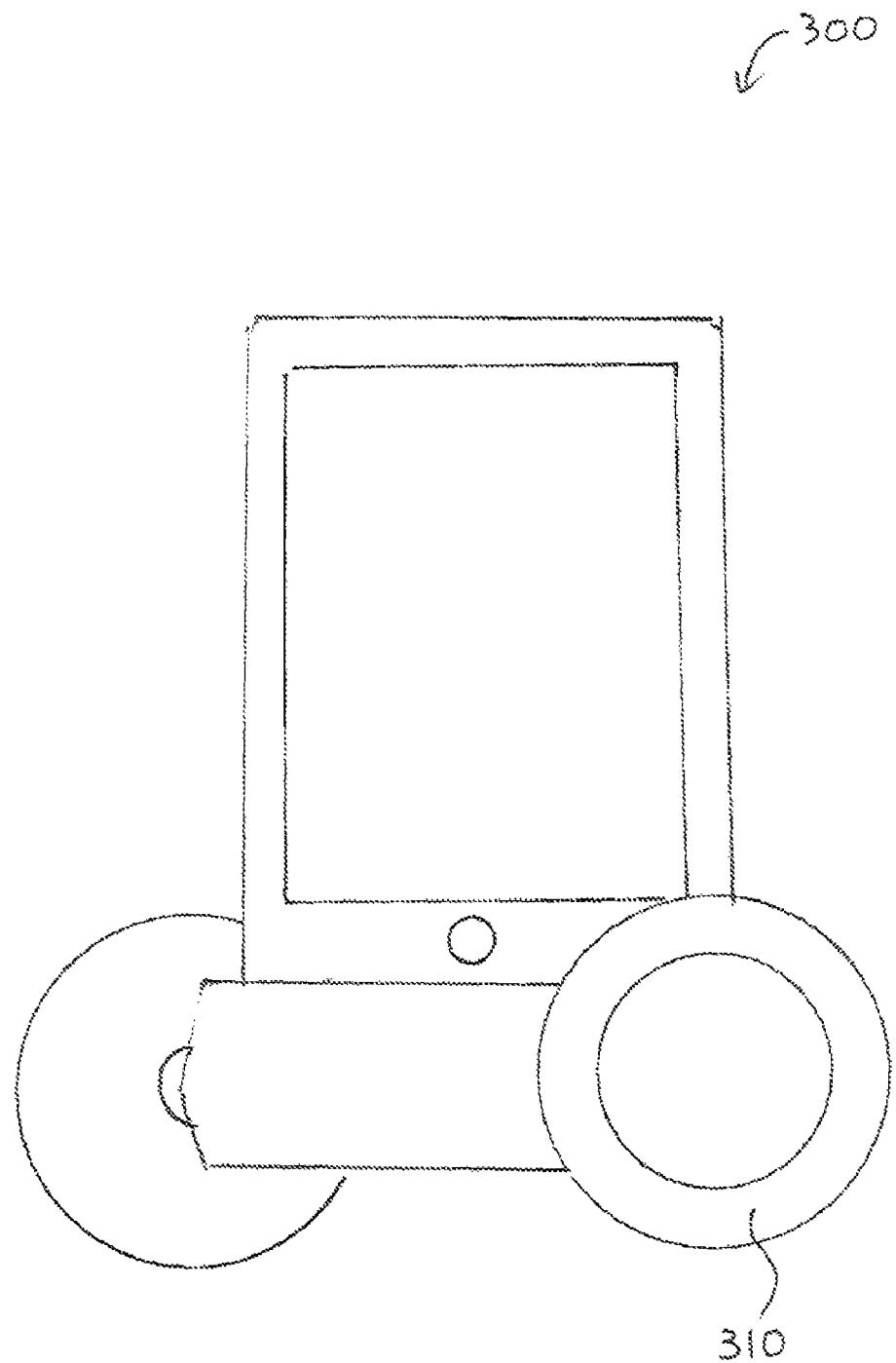
FIG. 3 illustrates a two-wheeled mobile charging system, according to one embodiment.

FIG. 3 illustrates a two-wheeled mobile charging system, according to one embodiment. Instead of having one or more legs 160, two-wheeled mobile charging system 300 moves on its wheels 310. Although FIG. 3 illustrates only two wheels 310, it is appreciated that other number of wheels may be used. For example, a three wheeled version such as Roomba™ by iRobot is used to facilitate movements in tight spaces. Depending on the system configuration, the size and power capacity of mobile device 110, different transportation mechanism may be used without deviating from the scope of the present subject matter.

Figure 4:
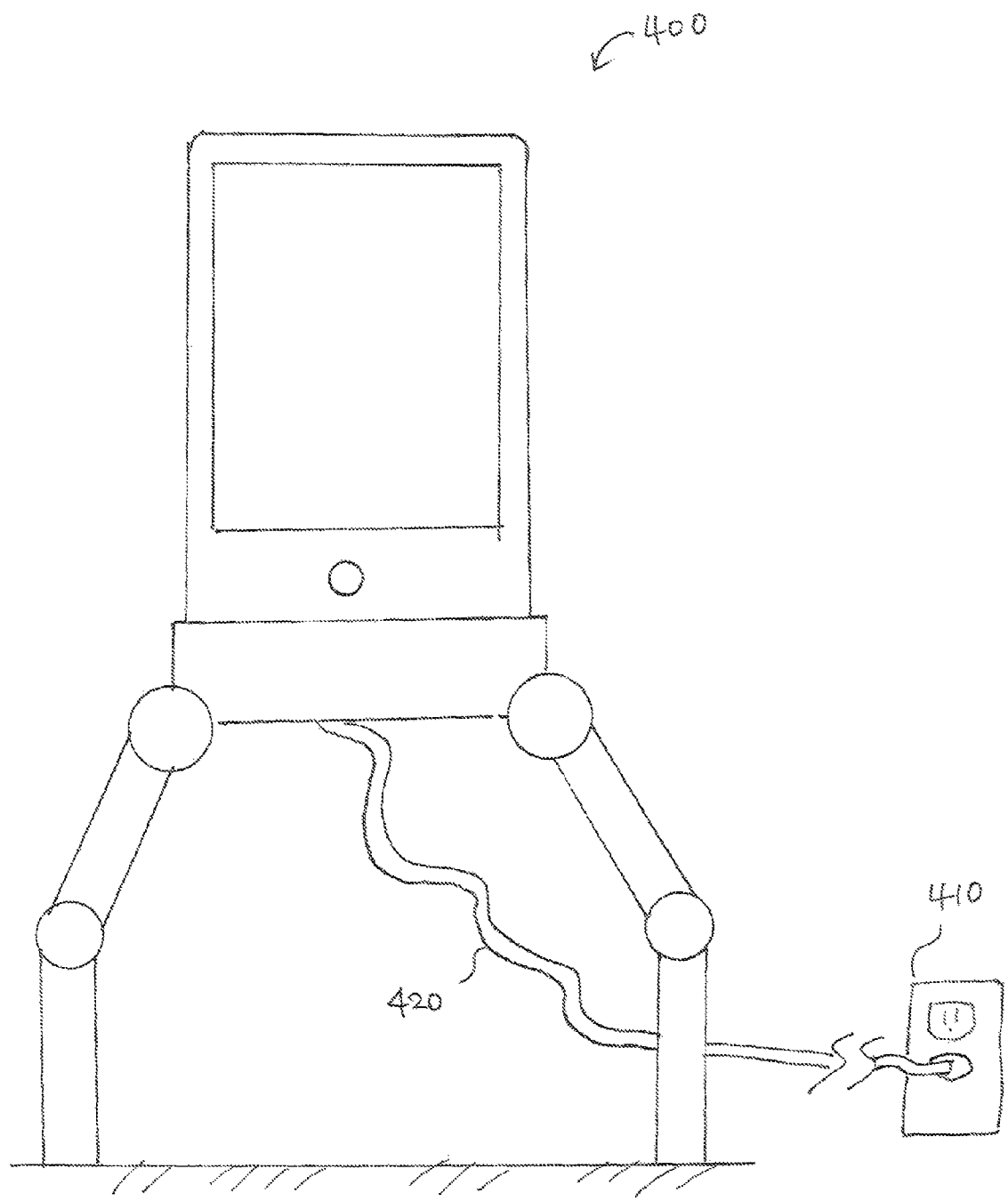
FIG. 4 illustrates an alternative embodiment of a mobile charging system.

FIG. 4 illustrates an alternative embodiment of a mobile charging system. Mobile charging system 400 carries its own power source such that it does not have to return to the base station for charging mobile device 110. Mobile charging system 400 may be directly plugged into a power outlet 410 using a power cord 420. Alternatively, mobile charging system 400 may be charged by electromagnetic induction without requiring power cord 420.

A system and method for charging a mobile device have been disclosed. Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

I claim:

1. A mobile charging system comprising:
a mobile device having a battery;
a robotic device removably connected to the mobile device, the robotic device being adapted to detect docking of the mobile device; and
a charging station removably connected to the robotic device,
wherein the robotic device autonomously returns to the charging station for charging the battery of the mobile device if the docking of the mobile device is detected.

2. The mobile charging system of claim 1, wherein the charging station is plugged into a power resource.

3. The mobile charging system of claim 1 has a power source for charging the battery of the mobile device.

4. The mobile charging system of claim 1, wherein the mobile device is a mobile phone, a cordless phone, an MP3 player, a media player, an electronic book, a portable computer, or a digital camera.

5. The mobile charging system of claim 1, wherein the robotic device comprises:
one or more actuators;
encoders for each actuator for the one or more actuators; and
a processor for receiving an instruction from the mobile device or a user.

6. The mobile charging system of claim 1, wherein the robotic device is a walking robot, a wheeled robot, a flying robot, or a crawling robot.

7. The mobile charging system of claim 1, wherein the robotic device detects presence of the mobile phone.

8. The mobile charging system of claim 1, wherein the robot device approaches the mobile device by walking, jumping, flying, sliding, or driving on wheels.

9. The mobile charging system of claim 1, wherein the robotic device tracks position of the mobile phone and/or the charging station.

10. The mobile charging system of claim 1, wherein the mobile charging system communicates with a computer and synchronizes with the computer.

11. A robotic system comprising:
a processor; one or more actuators;
a robotic device interface connecting with a mobile device having a battery;
a robotic device interface connecting with a mobile device having a battery;
a detection mechanism for detecting status of docking of the mobile device at the mobile device interface;
and a charging interface removably connecting to a charging system;
wherein the robotic device autonomously returns to the charging station for charging the battery of the mobile device if the status of docking of the mobile device is confirmed.

12. The robotic system of claim 11, wherein the charging station is plugged into a power resource.

13. The robotic system of claim 11 has a power source for charging the battery of the mobile device.

14. The robotic system of claim 11, wherein the mobile device is a mobile phone, a cordless phone, an MP3 player, a media player, an electronic book, a portable computer, or a digital camera.

15. The robotic system of claim 11, wherein the processor receives an instruction from the mobile device or a user.

16. The robotic system of claim 11, wherein the robotic system is a walking robot, a wheeled robot, a flying robot, or a crawling robot.

17. The robotic system of claim 11, wherein the robotic system detects presence of the mobile phone.

18. The robotic system of claim 11, wherein the robot system approaches the mobile device by walking, jumping, flying, sliding, or driving on wheels.

19. The robotic system of claim 11, wherein the robotic system tracks position of the mobile phone and/or the charging station.

20. The robotic system of claim 11, wherein the robotic system communicates with a computer and synchronizes with the computer.

* * * * *